(12) United States Patent
Miyazaki

(10) Patent No.: US 8,739,858 B2
(45) Date of Patent: Jun. 3, 2014

(54) EVAPORATOR AND VAPOR PRODUCTION METHOD

(75) Inventor: Tomio Miyazaki, Hadano (JP)

(73) Assignee: Honda Motor Co., Ltd., Tokyo (JP)

( * ) Notice: Subject to any disclaimer, the term of this patent is extended or adjusted under 35 U.S.C. 154(b) by 1156 days.

(21) Appl. No.: 11/919,714

(22) PCT Filed: May 23, 2006

(86) PCT No.: PCT/JP2006/310610
§ 371 (c)(1),
(2), (4) Date: Oct. 30, 2007

(87) PCT Pub. No.: WO2006/126699
PCT Pub. Date: Nov. 30, 2006

(65) Prior Publication Data
US 2009/0084524 A1    Apr. 2, 2009

(30) Foreign Application Priority Data
May 23, 2005   (JP) .................................. 2005-149234

(51) Int. Cl.
*F28D 7/02*    (2006.01)
*F02C 6/18*    (2006.01)

(52) U.S. Cl.
USPC .......................................... 165/163; 165/156

(58) Field of Classification Search
USPC .................. 29/890, 890.03; 60/780; 165/163, 165/104.21, 155, 156; 422/202, 203, 204; 429/436, 440, 441
See application file for complete search history.

(56) References Cited

U.S. PATENT DOCUMENTS

| | | | | |
|---|---|---|---|---|
| 4,241,043 A | * | 12/1980 | Hetzel | ........................ 423/659 |
| 4,345,915 A | * | 8/1982 | Vakil et al. | .................. 48/197 R |
| 6,447,940 B1 | * | 9/2002 | Ueda | ............................ 429/412 |
| 7,273,505 B2 | * | 9/2007 | Suzuki et al. | ................ 48/127.9 |
| 2002/0062943 A1 | * | 5/2002 | Kondo et al. | ..................... 165/4 |
| 2002/0081473 A1 | * | 6/2002 | Hanai et al. | ..................... 429/26 |
| 2004/0043262 A1 | * | 3/2004 | Asou et al. | ...................... 429/17 |

(Continued)

FOREIGN PATENT DOCUMENTS

| | | |
|---|---|---|
| DE | 10303497 | 8/2004 |
| DE | 10303497 A1 * | 8/2004 |

(Continued)

OTHER PUBLICATIONS

Machine translation of DE 10303497A1, Aug. 12, 2004.*

(Continued)

*Primary Examiner* — Tho V Duong
(74) *Attorney, Agent, or Firm* — Nelson Mullins Riley & Scarborough LLP; Anthony A. Laurentano

(57) ABSTRACT

An evaporator includes a double pipe provided between an outer cylindrical member and an inner cylindrical member. The double pipe includes an inner pipe as a passage of water and an outer pipe as a passage of raw fuel. The inner pipe has a plurality of small holes connected to the outer pipe for maintaining the pressurized state of the water in the inner pipe. When the water gushes out of the small holes of the inner pipe in the outer pipe, phase transition of the water from the liquid phase to the gas phase occurs, and the water vapor is mixed with the raw fuel in the gas phase in the outer pipe.

7 Claims, 11 Drawing Sheets

(56) References Cited

U.S. PATENT DOCUMENTS

| | | | |
|---|---|---|---|
| 2005/0129997 A1* | 6/2005 | Maenishi et al. | 429/20 |
| 2006/0057059 A1* | 3/2006 | Nishida et al. | 423/648.1 |
| 2007/0082237 A1* | 4/2007 | Kim et al. | 429/20 |
| 2008/0044695 A1* | 2/2008 | Kaupert | 429/17 |

FOREIGN PATENT DOCUMENTS

| | | |
|---|---|---|
| EP | 1 162 171 A1 | 12/2001 |
| JP | 09-076737 | 3/1997 |
| JP | 2000-016801 | 1/2000 |
| JP | 2001-180904 | 7/2001 |
| JP | 2002-39023 | 2/2002 |
| JP | 2002-358996 | 12/2002 |
| JP | 2003-246605 | 9/2003 |
| JP | 2003-269878 | 9/2003 |
| WO | WO-03/078895 A1 | 9/2003 |
| WO | WO-2004/022480 A2 | 3/2004 |

OTHER PUBLICATIONS

Japanese Office Action for Application No. 2005-149234, dated Oct. 27, 2009.

* cited by examiner

----> RAW FUEL (REFORMED GAS)

RAW FUEL (REFORMED GAS)

EVAPORATOR AND VAPOR PRODUCTION METHOD

RELATED APPLICATIONS

This application is a 35 U.S.C. 371 national stage filing of International Application No. PCT/JP2006/310610, filed 23 May 2006, which claims priority to Japan Patent Application No. 2005-149234 filed on 23 May 2005 in Japan. The contents of the aforementioned applications are hereby incorporated by reference.

TECHNICAL FIELD

The present invention relates to an evaporator and a vapor production method for producing vapor by heat exchange between a heating fluid flowing through a heating fluid channel and first and second heated fluids flowing through a heat conductive double pipe member provided in the heating fluid channel.

BACKGROUND ART

For example, a solid oxide fuel cell (SOFC) employs an electrolyte of ion-conductive oxide such as stabilized zirconia. The electrolyte is interposed between an anode and a cathode to form an electrolyte electrode assembly (unit cell). The electrolyte electrode assembly is interposed between separators (bipolar plates). In use, predetermined numbers of the unit cells and the separators are stacked together to form a fuel cell stack.

Normally, as a fuel gas supplied to the fuel cell, a hydrogen gas produced from a hydrocarbon based raw fuel by a reformer is used. In the reformer, the hydrocarbon based raw fuel such as a fossil fuel, e.g., methane or LNG is subjected to steam reforming or partial oxidation reforming, autothermal reforming or the like to produce a reformed gas (fuel gas).

For example, in the reformer for performing steam reforming, an evaporator is used for producing mixed vapor by mixing a raw fuel and water vapor. For example, Japanese Laid-Open Patent Publication No. 2000-16801 discloses an evaporator as shown in FIG. 11. The evaporator includes a double pipe 3 comprising an outer pipe 1 and an inner pipe 2. A plurality of heat conduction fins 1a are attached to the outer circumferential portion of the outer pipe 1, and spiral grooves 1b are formed in the inner circumferential portion of the outer pipe 1. A liquid supply pipe 1c is attached to an end of the outer pipe 1.

A sintered metal pipe 4 is interposed between the outer pipe 1 and the inner pipe 2 to form a vapor channel 5 between the sintered metal pipe 4 and the outer circumferential surface of the inner pipe 2. A heat medium channel 6 is formed in the inner pipe 2.

In the structure, since a hot gas 7a is supplied from the outside of the double pipe 3, the sintered metal pipe 4 is heated through the heat conduction fins 1a, and a heat medium 7b is supplied to the heat medium channel 6. A liquid to be vaporized (e.g., methanol, water, or mixed liquid of methanol and water) 8a is supplied to the liquid supply pipe 1c. When the liquid 8a is supplied to the spiral grooves 1b, the sintered metal pipe 4 is impregnated with the liquid 8a, and the liquid 8a is vaporized in the sintered metal pipe 4. Thus, the vapor 8b is supplied to the vapor channel 5.

In the case of using the evaporator for carrying out steam reforming in the solid oxide fuel cell, it is desirable that the hot exhaust gas discharged from the fuel cell is utilized as the hot gas 7a. It is because the temperature of the exhaust gas is considerably high (about 700° C.), and heat utilization ratio is improved by collecting the heat of the exhaust gas.

However, conditions such as the temperature and the flow rate of the exhaust gas change easily depending on the state of operation of the fuel cell. Thus, when the mixed fluid of the raw fuel (gas) and the water, or the water is supplied to the spiral grooves 1b as the liquid 8a to be vaporized, vaporization failure or boiling of water may occur, and vaporization and condensation may be repeated undesirably. Under the circumstances, fluctuation in the amount of produced water vapor occurs, and it is not possible to reliably obtain the mixed vapor (uniformly mixed raw fuel and water vapor). Further, pressure fluctuation (pulsation) in the mixed vapor occurs easily. Thus, at the time of producing a reformed gas by reforming the mixed vapor, the reforming reaction is not stable. The amount of electrical energy generated in the fuel cell fluctuates, and coking may occur due to the temporal shortage of water.

DISCLOSURE OF INVENTION

A main object of the present invention is to provide an evaporator and a vapor production method in which first and second heated fluids in the gas phase can be agitated, and mixed together to produce a uniform mixed fluid reliably.

The present invention relates to an evaporator and a vapor production method for producing vapor by heat exchange between a heating fluid flowing through a heating fluid channel and first and second heated fluids flowing through a heat conductive double pipe member provided in the heating fluid channel.

Firstly, the pressurized state of the first heated fluid in the liquid phase is maintained in an inner pipe of the double pipe member, and the second heated fluid is supplied to an outer pipe of the double pipe member. Then, phase transition of the first heated fluid from the liquid phase to the gas phase is induced when the first heated fluid gushes out of small holes of the inner pipe into the outer pipe, so that the first heated fluid in the gas phase is mixed with the second heated fluid in the outer pipe to produce a mixed fluid.

Preferably, the heating fluid and the first and second heated fluids flow in a counterflow manner. The counterflow manner herein not only includes the case in which the flow direction of the heating fluid (e.g., exhaust gas) flowing into one side of the evaporator is opposite to the flow direction of the first and second heated fluids (e.g., raw fuel and water) flowing into the other side of the evaporator, and but also includes the case in which, when the first and second heated fluids flow through the heat conductive double pipe member, the flow direction of the heating fluid is temporarily perpendicular to the flow direction of the first and second heated fluids.

Preferably, the second heated fluid flowing through the outer pipe is in the gas phase. Further, preferably, the small holes pass through the inner pipe in the direction perpendicular to the flow direction of the second heated fluid.

Further, preferably, the temperature in the outer pipe is higher than the temperature in the inner pipe, and the pressure in the outer pipe is lower than the pressure in the inner pipe.

Further, preferably, the evaporator further comprises an outer cylindrical member and an inner cylindrical member forming the heating fluid channel, and the double pipe member is provided between the outer cylindrical member and the inner cylindrical member. Further, preferably, the double pipe member is formed spirally between the outer cylindrical member and the inner cylindrical member.

BEST MODE FOR CARRYING OUT THE INVENTION

Figure 1:
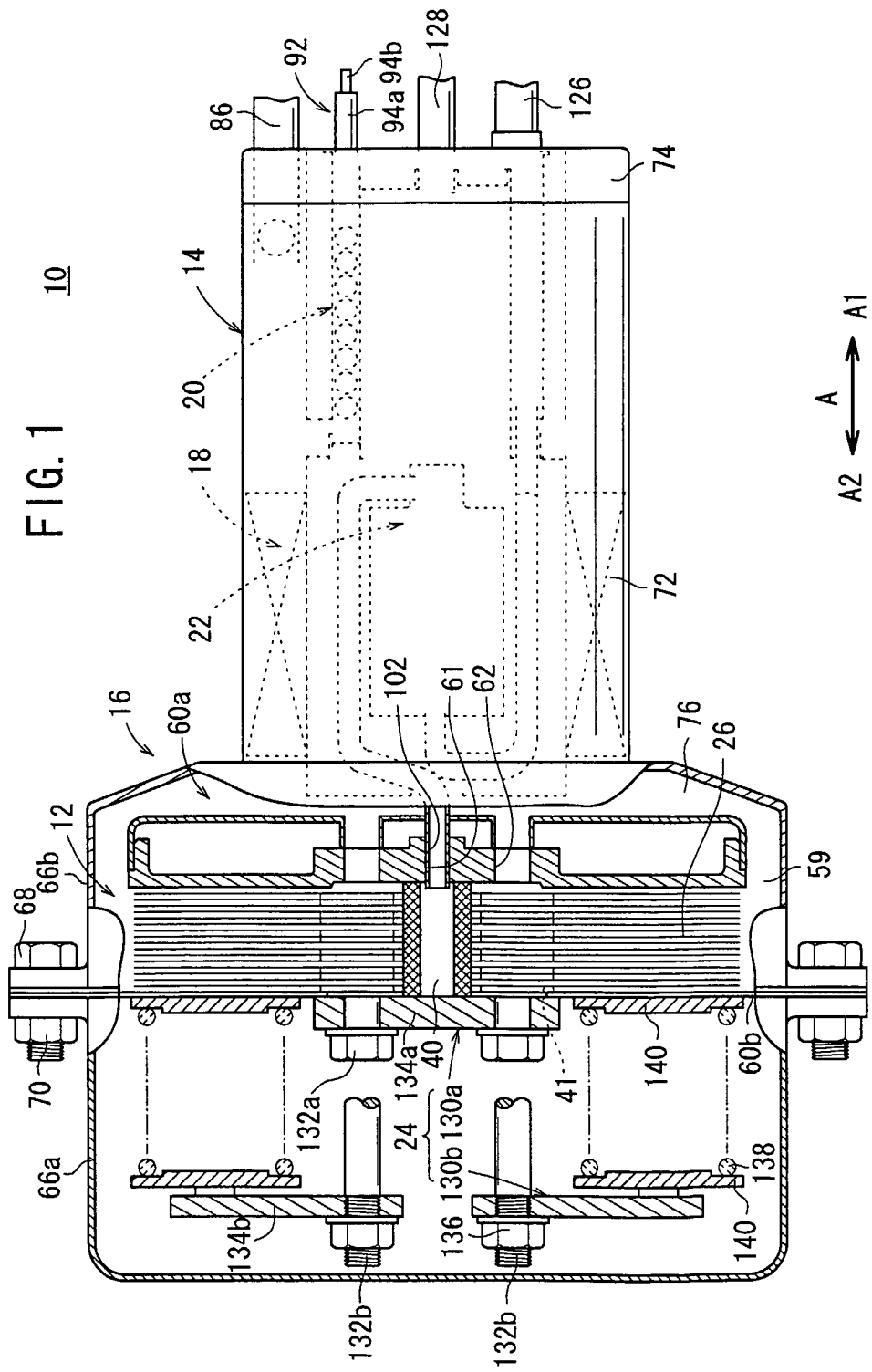
FIG. 1 is a partial cross sectional view showing a fuel cell system including an evaporator according to a first embodiment of the present invention.

A fuel cell system 10 is used in various applications, including stationary and mobile applications. For example, the fuel cell system 10 is mounted on a vehicle. As shown in FIG. 1, the fuel cell system 10 includes a fuel cell stack 12, a fluid unit 14 provided on one side of the fuel cell stack 12, and a casing 16 containing the fuel cell stack 12 and the fluid unit 14.

Figure 2:
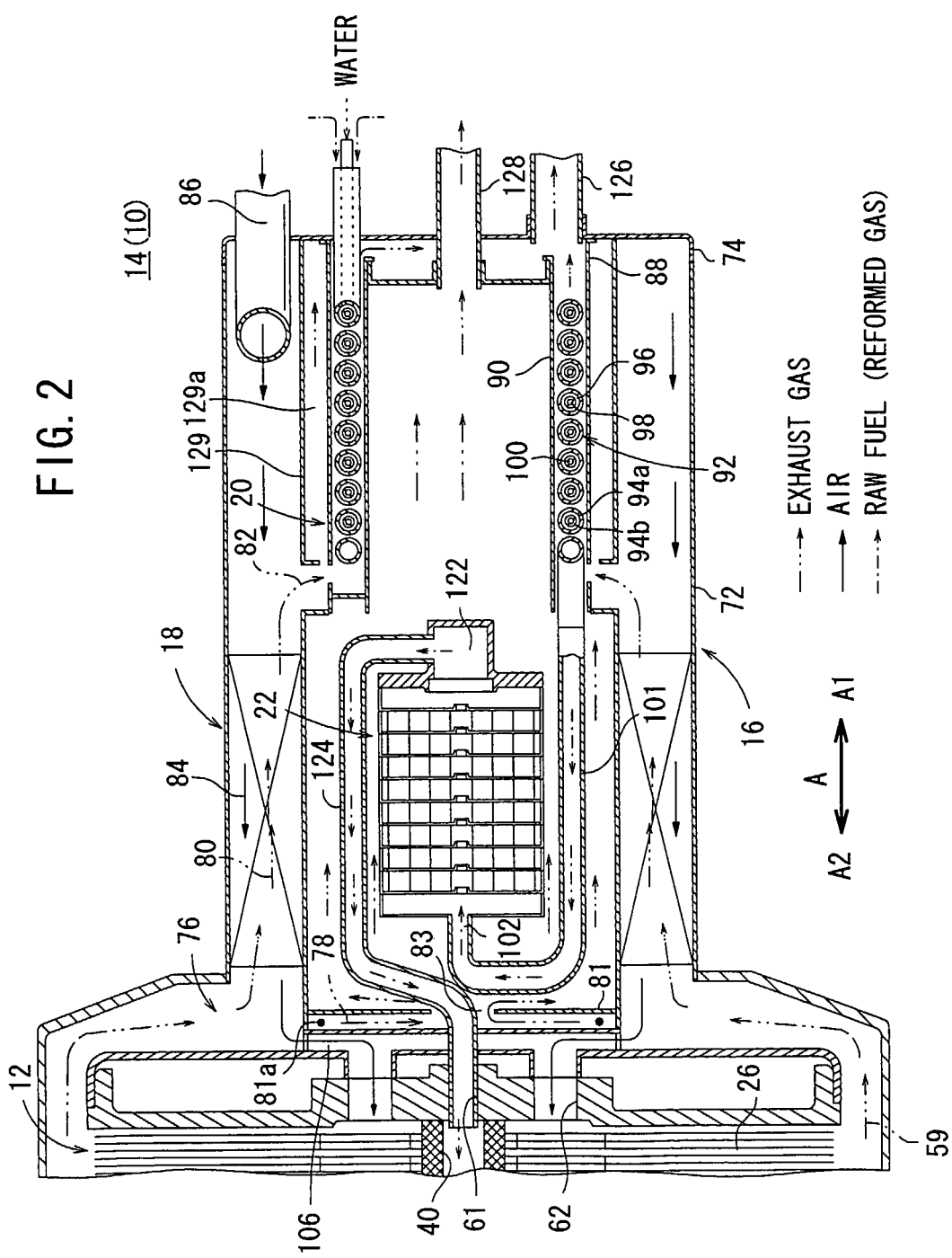
FIG. 2 is a cross sectional view showing main components of a fluid unit of the fuel cell system.

As shown in FIGS. 1 and 2, the fluid unit 14 includes a heat exchanger 18 for heating an oxygen-containing gas before it is supplied to the fuel cell stack 12, an evaporator 20 according to a first embodiment of the present invention for evaporating water to produce a mixed fuel (a mixed fluid) of raw fuel chiefly containing hydrocarbon (e.g., the city gas) and the water vapor, and a reformer 22 for reforming the mixed fuel to produce a fuel gas.

The reformer 22 is a preliminary reformer for producing a fuel gas chiefly containing methane ($CH_4$) using hydrocarbon of high carbon ($C_{2+}$) such as ethane ($C_2H_6$), propane ($C_3H_6$), and butane ($C_4H_{10}$) in the city gas by steam reforming. The operating temperature of the reformer 22 is in the range of 300° C. to 400° C.

Figure 3:
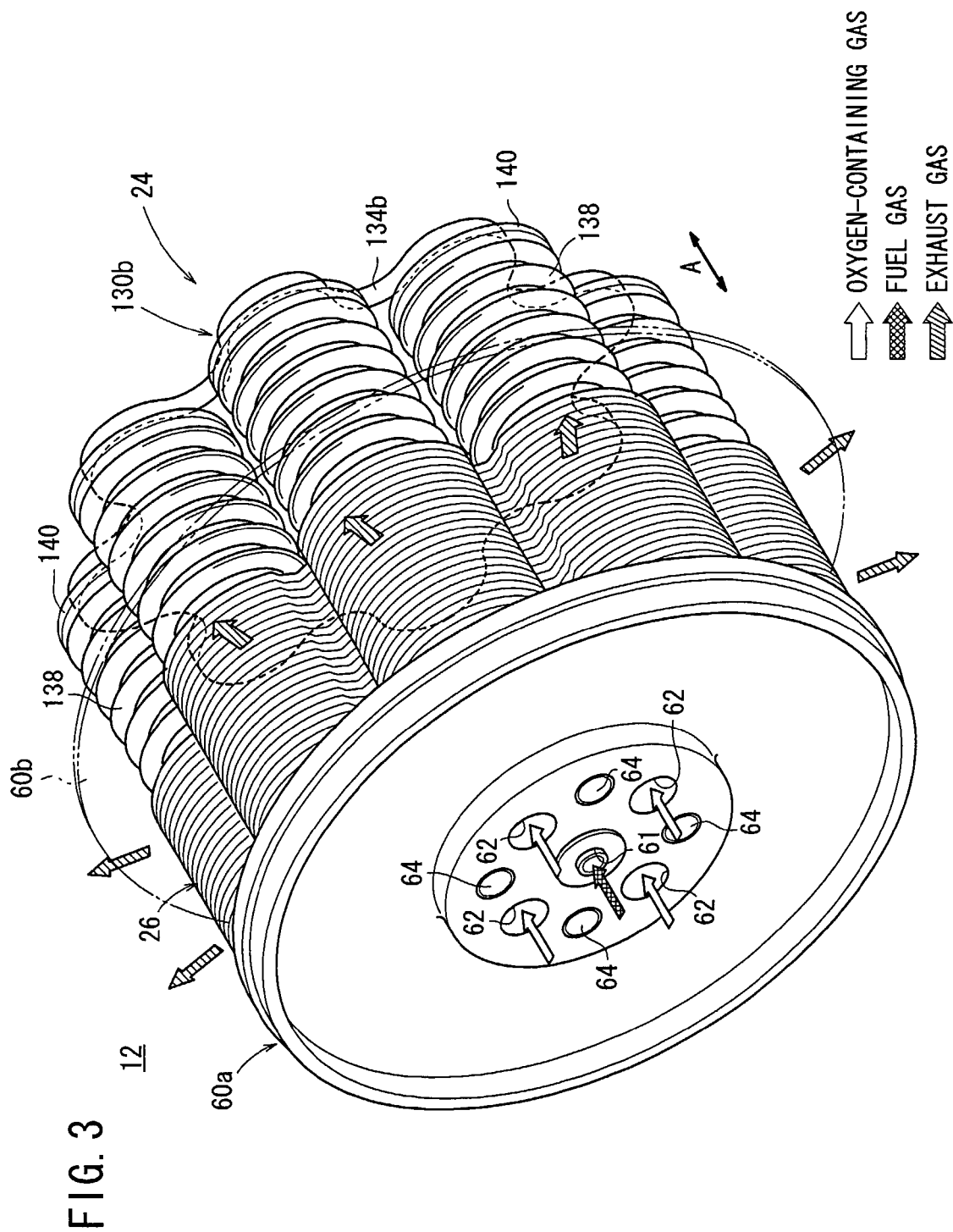
FIG. 3 is a perspective view schematically showing a fuel cell stack of the fuel cell system.

In the casing 16, a load applying mechanism 24 is provided on the other side of the fuel cell stack 12 for applying a tightening load in a stacking direction of the fuel cells 26 of the fuel cell stack 12 indicated by an arrow A (see FIGS. 1 and 3). The fluid unit 14 and the load applying mechanism 24 are provided symmetrically with respect to the central axis of the fuel cell stack 12.

Figure 4:
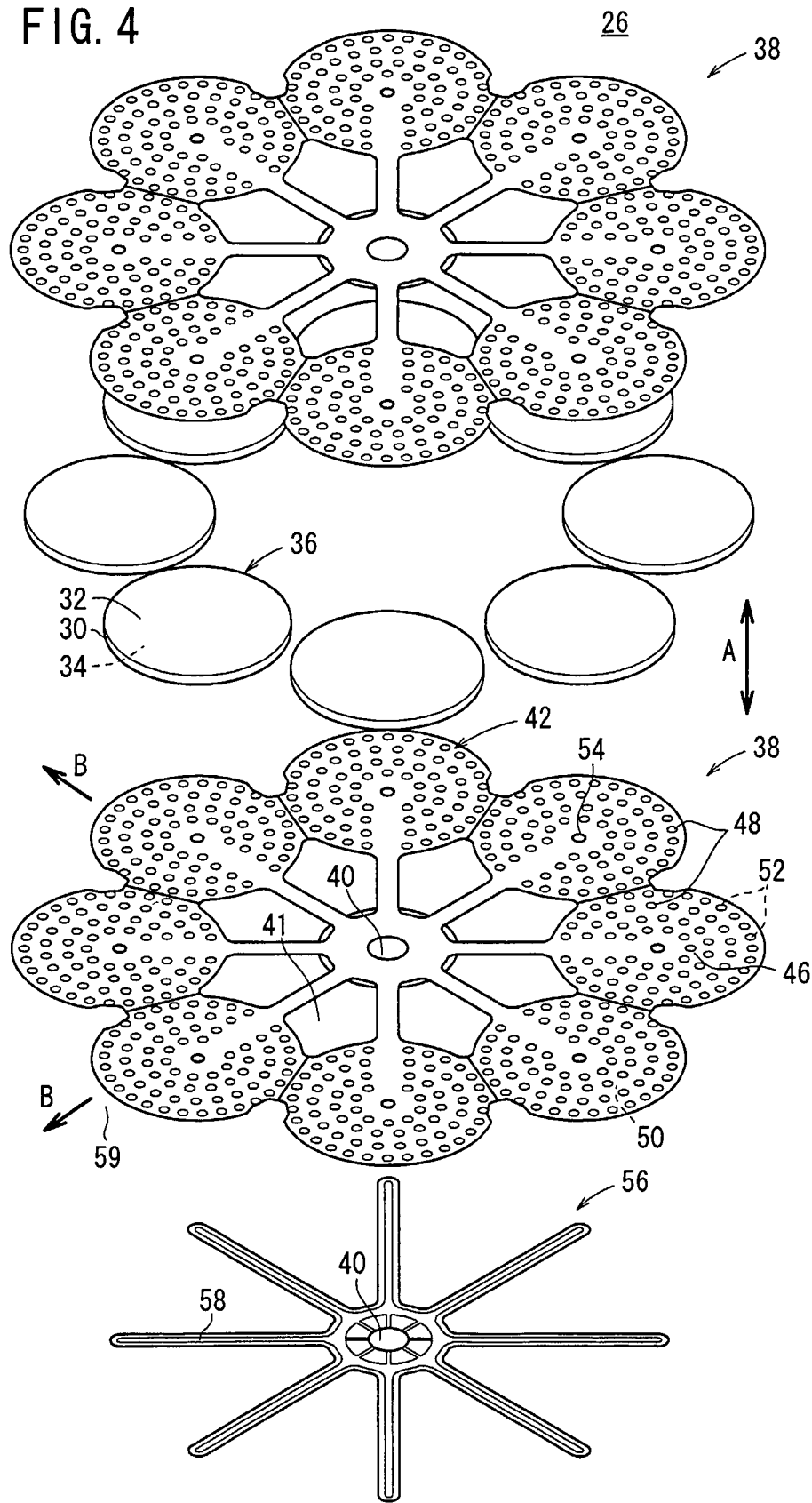
FIG. 4 is an exploded perspective view showing a fuel cell of the fuel cell stack.
Figure 5:
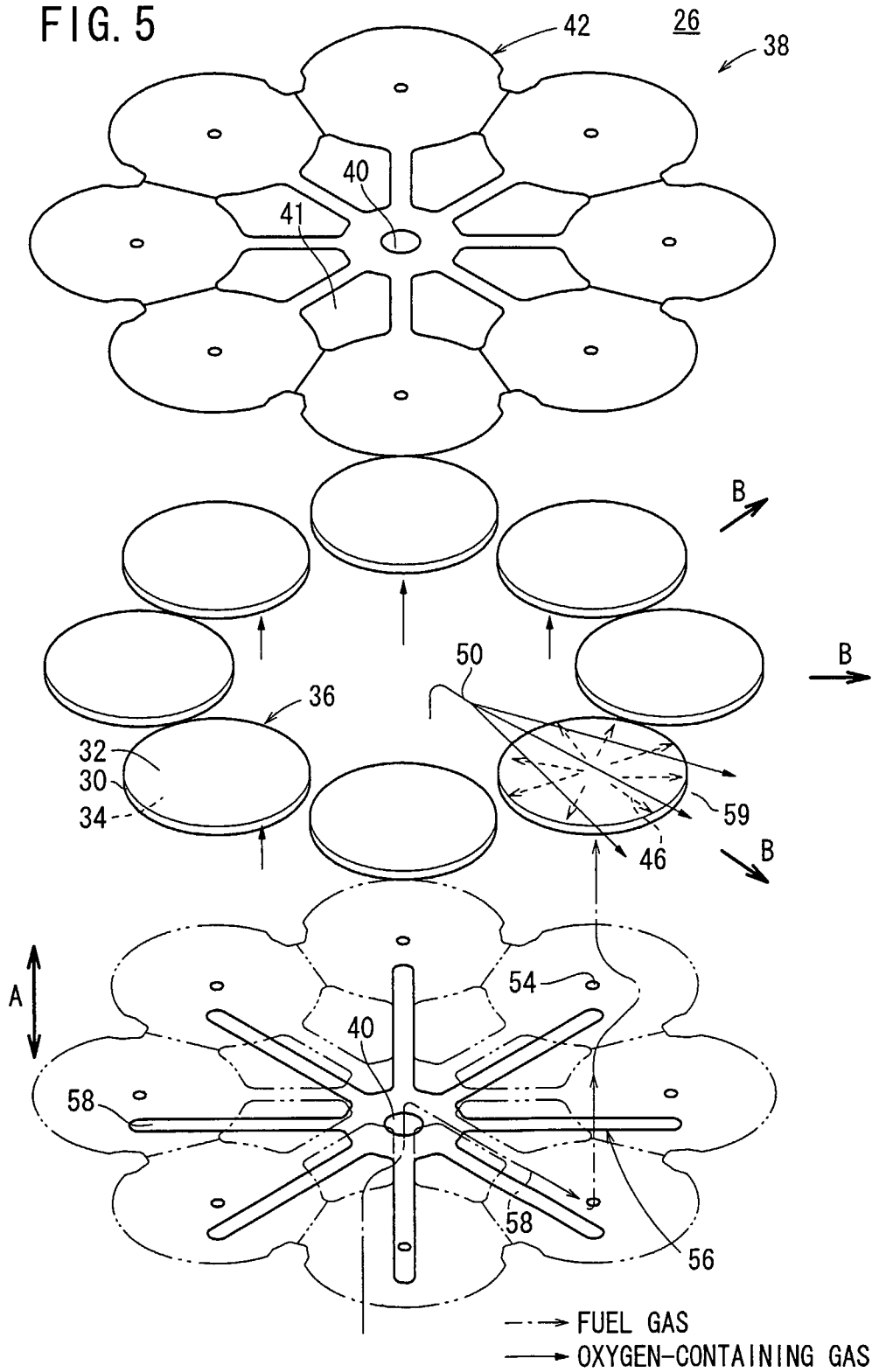
FIG. 5 is a partial exploded perspective view showing gas flows in the fuel cell.

The fuel cell 26 is a solid oxide fuel cell. As shown in FIGS. 4 and 5, the fuel cell 26 includes electrolyte electrode assemblies 36. Each of the electrolyte electrode assemblies 36 includes a cathode 32, an anode 34, and an electrolyte (electrolyte plate) 30 interposed between the cathode 32 and the anode 34. For example, the electrolyte 30 is made of ion-conductive oxide such as stabilized, zirconia.

The operating temperature of the fuel cell 26 is high, about 700° C. or more. In the electrolyte electrode assembly 36, hydrogen is produced by reforming methane in the fuel gas, and the hydrogen is supplied to the anode 34.

A plurality of, e.g., eight electrolyte electrode assemblies 36 are sandwiched between a pair of separators 38 to form the fuel cell 26. The eight electrolyte electrode assemblies 36 are arranged in a circle concentric with a fuel gas supply passage 40 extending through the center of the separators 38. An oxygen-containing gas supply unit 41 is provided hermetically around the fuel gas supply passage 40.

In FIG. 4, for example, each of the separators 38 comprises a single metal plate of, e.g., stainless alloy or a carbon plate. The fuel gas supply passage 40 extends through the center of the separators 38. The separator 38 includes a plurality of circular disks 42. Each of the circular disks 42 has first protrusions 48 on its surface which contacts the anode 34. The first protrusions 48 form a fuel gas channel 46 for supplying the fuel gas along an electrode surface of the anode 34.

Each of the circular disks 42 has second protrusions 52 on its surface which contacts the cathode 32. The second protrusions 52 form an oxygen-containing gas channel 50 for supplying the oxygen-containing gas along an electrode surface of the cathode 32. As shown in FIGS. 4 and 5, each of the circular disks 42 has a fuel gas inlet 54 for supplying the fuel gas to the fuel gas channel 46.

A channel member 56 is fixed to the separator 38 by brazing or laser welding on a surface facing the cathode 32. The fuel gas supply passage 40 extends through the center of the channel member 56. The channel member 56 forms a fuel gas supply channel 58 connecting the fuel gas supply passage 40 and the fuel gas channel 46. An exhaust gas discharge channel 59 is formed around the separators 38 for discharging consumed reactant gases as an exhaust gas.

As shown in FIGS. 1 and 3, the fuel cell stack 12 includes a plurality of the fuel cells 26 stacked together, and end plates 60a, 60b provided at opposite ends in the stacking direction. A hole 61 is formed at the center of the end plate 60a, and holes 62 and screw holes 64 are formed alternately at predetermined angular intervals along the same virtual circle around the hole 61. The holes 62 are connected to an air channel 84 as described later.

As shown in FIG. 1, the casing 16 includes a first case unit 66a containing the load applying mechanism 24 and a second case unit 66b containing the fuel cell stack 12. The end plate 60b and an insulating member (not shown) are sandwiched between the first case unit 66a and the second case unit 66b. The insulating member is provided on the side of the second case unit 66b. The joint portion between the first case unit 66a and the second case unit 66b is tightened by screws 68 and nuts 70.

The second case unit 66b is joined to one end of a cylindrical third case unit 72 as part of the fluid unit 14. A head plate 74 is fixed to the other end of the third case unit 72. An exhaust gas channel 76 is provided in the third case unit 72. The exhaust gas after consumption in the power generation discharged from the exhaust gas discharge channel 59 of the fuel cell stack 12 flows through the exhaust gas channel 76 in the fluid unit 14.

As shown in FIG. 2, the exhaust gas channel 76 includes a first channel 78 for supplying the exhaust gas to the reformer 22 as a heat source for reforming the mixed fuel, a second channel 80 for supplying the exhaust gas to the heat exchanger 18 as a heat source for heating the oxygen-containing gas, and a heating fluid channel 82 connected to the downstream side of the second channel 80 for supplying the exhaust gas to the evaporator 20 as a heat source for evaporating water. The second channel 80 is a main passage, and the first channel 78 is branched from the second channel 80 through a plurality of holes 81a formed in a wall 81. The first channel 78 is opened to the reformer 22 through a rectification hole 83.

The reformer 22 and the evaporator 20 are arranged in the direction indicated by the arrow A1 such that the reformer 22 is positioned on the side of the fuel cell stack 12, and the evaporator 20 is positioned on the side away from the fuel cell stack 12. The heat exchanger 18 is provided outside the reformer 22. The distance between the heat exchanger 18 and the reformer 22, and the fuel cell stack 12 should be minimized. The exhaust gas discharge channel 59 of the fuel cell stack 12 is directly connected to the second channel 80 of the exhaust gas channel 76.

The second channel 80 is provided inside the heat exchanger 18. Further, an air channel 84 for the passage of the air is provided inside the heat exchanger 18, near the second channel 80. In the structure, the exhaust gas and the air heated by the exhaust gas flow in a counterflow manner. The air channel 84 is connected to the air supply pipe 86 at the head plate 74.

Figure 6:
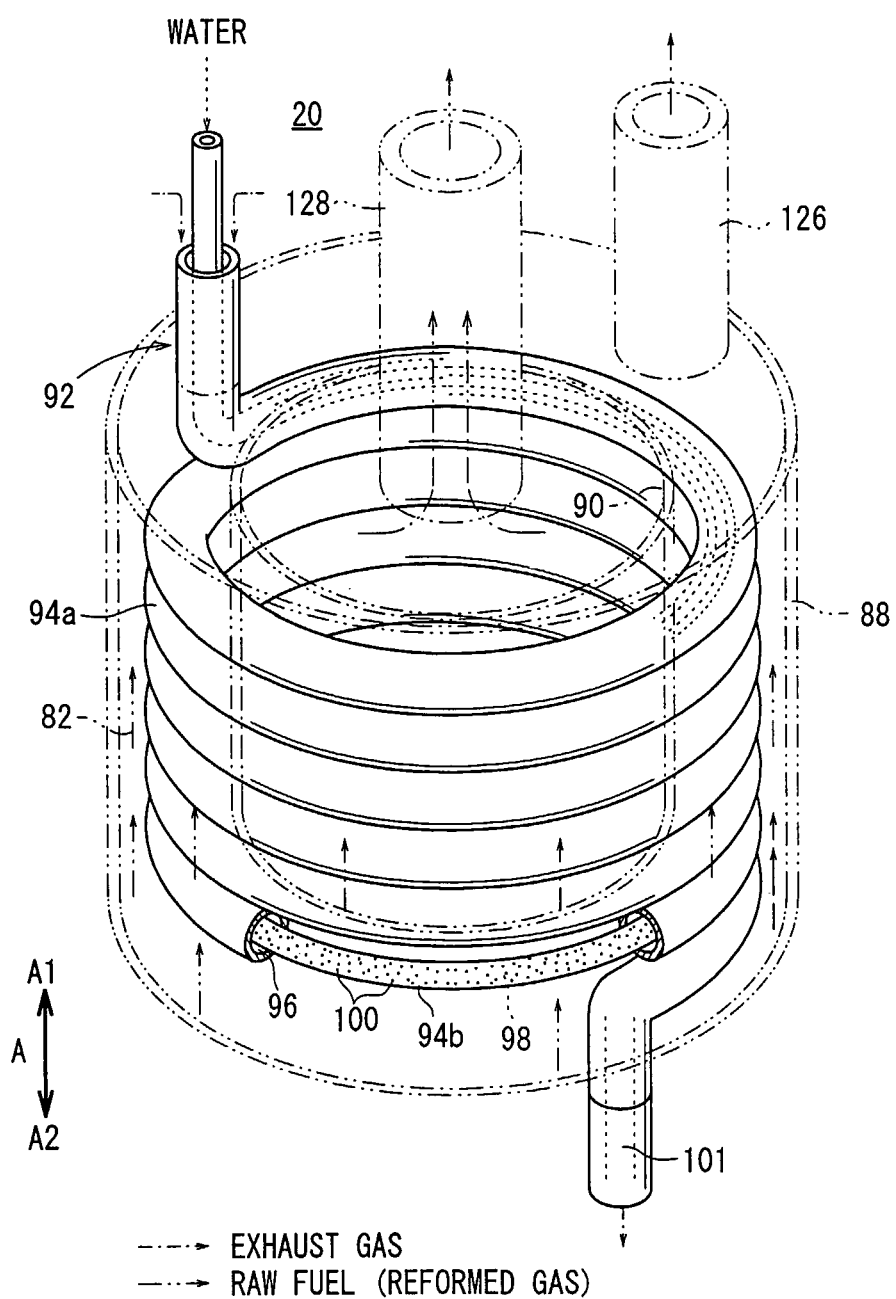
FIG. 6 is a perspective view showing main components of the evaporator.

The evaporator 20 has an outer cylindrical member 88 and an inner cylindrical member 90. The outer cylindrical member 88 and the inner cylindrical member 90 are coaxial with each other. A double pipe 92 is provided spirally between the outer cylindrical member 88 and the inner cylindrical member 90. As shown in FIGS. 2 and 6, the double pipe 92 includes an outer pipe 94a and an inner pipe 94b. The heating fluid channel 82 is formed between the outer pipe 94a, and the outer cylindrical member 88 and the inner cylindrical member 90.

A raw fuel channel 96 as a passage of a raw fuel (a second heated fluid) in the gas phase is formed between the outer pipe 94a and the inner pipe 94b. A water channel 98 as a passage of water (a first heated fluid) is formed inside the inner pipe 94b. The inner pipe 94b has a plurality of holes 100 on the downstream side of the evaporator 20.

The small holes 100 are connected to the outer pipe 94a for maintaining the pressurized state of the water in the inner pipe 94b, and causing phase transition of the water from the liquid phase to the gas phase such that the water gushing out of the small holes 100 of the inner pipe 94b into the outer pipe 94a is mixed with the raw fuel in the outer pipe 94a. For example, the diameter of the small holes 100 is in the range of 10 μm to 100 μm. The small holes 100 pass through the inner pipe 94b in the direction perpendicular to the flow direction of the raw fuel in the outer pipe 94a.

Heat is conducted from the exhaust gas flowing in the heating fluid channel 82 to the outer pipe 94a. Therefore, the temperature in the outer pipe 94a is higher than the temperature in the inner pipe 94b. Further, since the small holes 100 are provided in the inner pipe 94b, the pressure in the inner pipe 94b is regulated to be higher than the pressure in the outer pipe 94a. The exhaust gas as the heating fluid, and the water and the raw fuel flow in a counterflow manner. The counterflow manner herein includes the case in which the flow direction of the exhaust gas is opposite to the flow direction of the water and the raw fuel, and the case in which the flow direction of the exhaust gas is perpendicular to the flow direction of the water and the raw fuel.

An end of the double pipe 92 on the upstream side extends through the head plate 74 to the outside. At an end of the double pipe 92 on the downstream side, the inner pipe 94b is terminated, and only the outer pipe 94a extends in the direction indicated by the arrow A2. An end of a mixed fuel supply pipe 101 is connected to the outer pipe 94a, and the other end of the mixed fuel supply pipe 101 is connected to an inlet 102 of the reformer 22 (see FIG. 2). The mixed fuel supply pipe 101 extends toward the fuel cell stack 12, and is connected to the inlet 102. The inlet 102 is provided near the rectification hole 83 connected to the first channel 78 branched from the exhaust gas channel 76.

Figure 7:
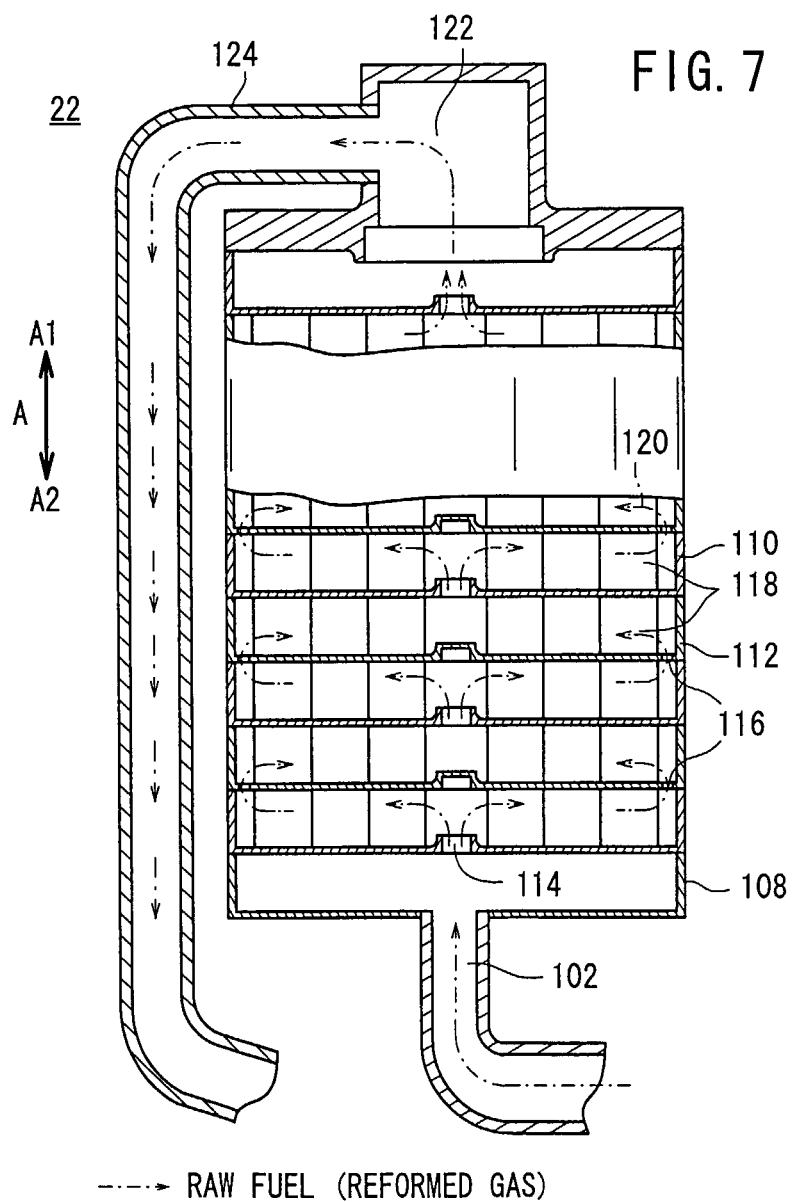
FIG. 7 is a partial cross sectional view showing a reformer of the fuel cell system.
Figure 8:
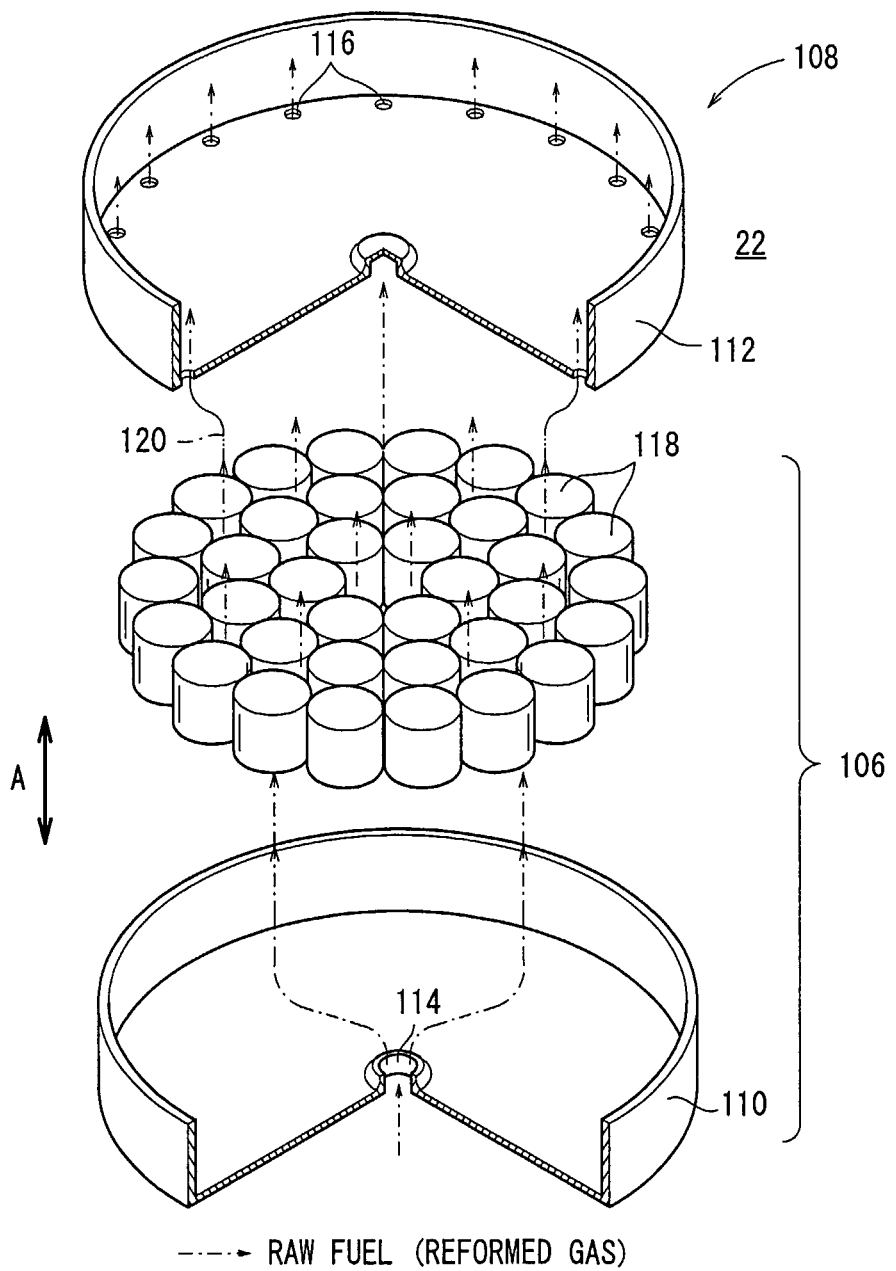
FIG. 8 is an exploded perspective view showing main components of the reformer.

As shown in FIG. 7, the reformer 22 has a lid 108, and the inlet 102 is formed at the lid 108. The lid 108 is positioned at an end of the reformer 22, and the reformer 22 is formed by connecting first receiver members 110 and second receiver members 112 alternately. As shown in FIGS. 7 and 8, the first and second receiver members 110, 112 have a substantially plate shape. A hole 114 is formed at the center of the first receiver member 110. A plurality of holes 116 are formed in a circle in the peripheral portion of the second receiver member 112.

A plurality of reforming catalyst pellets 118 are sandwiched between the first and second receiver members 110, 112. Each of the catalyst pellets 118 has a columnar shape. For example, the catalyst pellet 118 is formed by providing a nickel based catalyst on the base material of ceramics compound.

A reforming channel 120 is formed in the reformer 22. The reforming channel 120 extends in the direction indicated by the arrow A1, and has a serpentine pattern going through the holes 114 of the first receiver members 110 and the holes 116 of the second receiver members 112. On the downstream side of the reformer 22 (at the end of the reformer 22 in the direction indicated by the arrow A1), an outlet 122 is provided, and an end of a reformed gas supply passage 124 is connected to the outlet 122 (see FIG. 7). As shown in FIG. 2, the reformed gas supply passage 124 extends along the axis of the reformer 22, into the hole 61 of the end plate 60a, and is connected to the fuel gas supply passage 40.

A main exhaust gas pipe 126 and an exhaust gas pipe 128 are connected to the head plate 74. The main exhaust gas pipe 126 is connected to the heating fluid channel 82 of the evaporator 20. The exhaust gas pipe 128 is provided at the center of the evaporator 20 for discharging the exhaust gas flowing around the reformer 22 in the direction indicated by the arrow A1.

A cylindrical cover 129 is provided around the outer cylindrical member 88 of the evaporator 20. A heat insulating layer 129a is formed in a closed space between the cylindrical cover 129 and the outer cylindrical member 88. The heat insulating layer 129a is connected to the second channel 80, and some of the exhaust gas is filled in the heat insulating layer 129a.

As shown in FIG. 1, the load applying mechanism 24 includes a first tightening unit 130a for applying a first tightening load to a region around (near) the fuel gas supply passage 40 and a second tightening unit 130b for applying a second tightening load to the electrolyte electrode assemblies 36. The second tightening load is smaller than the first tightening load.

As shown in FIGS. 1 and 3, the first tightening unit 130a includes short first tightening bolts 132a screwed into screw holes 64 formed along one diagonal line of the end plate 60a. The first tightening bolts 132a extend in the stacking direction of the fuel cells 26, and engage a first presser plate 134a. The first presser plate 134a is a narrow plate, and engages the central position of the separator 38 to cover the fuel gas supply passage 40.

The second tightening unit 130b includes long second tightening bolts 132b screwed into screw holes 64 formed along the other diagonal line of the end plate 60a. Ends of the second tightening bolts 132b extend through a second presser plate 134b having a curved outer section. Nuts 136 are fitted to the ends of the second tightening bolts 132b. Springs 138 and spring seats 140 are provided in respective circular portions of the second presser plate 134*b*, at positions corresponding to the electrolyte electrode assemblies 36 on the circular disks 42 of the fuel cell 26. For example, the springs 138 are ceramics springs.

Operation of the fuel cell system 10 will be described below.

As shown in FIGS. 2 and 6, a raw fuel such as the city gas (including $CH_4$, $C_2H_6$, $C_3H_8$, and $C_4H_{10}$) is supplied to the raw fuel channel 96 of the double pipe 92 of the evaporator 20, and water is supplied to the water channel 98 of the double pipe 92. Further, an oxygen-containing gas such as the air is supplied to the air supply pipe 86.

In the evaporator 20, the raw fuel moves spirally along the raw fuel channel 96 in the double pipe 92, the water moves spirally along the water channel 98, and the exhaust gas as described later flows through the heating fluid channel 82 in a counterflow manner with respect to the raw fuel and the water. Thus, the water moving through the water channel 98 is evaporated, and gushes out from a plurality of holes 100 formed on the downstream side of the inner pipe 94*b* to the raw fuel channel 96.

In the first embodiment, the inner pipe 94*b* of the double pipe 92 has the small holes 100, and the diameter of the small holes 100 is in the range of 10 μm to 100 μm. In the structure, the pressurized state of the water supplied into the inner pipe 94*b* is maintained. The water in the inner pipe 94*b* is in the liquid phase. The raw fuel flows through the outer pipe 94*a* of the double pipe 92 in the gas phase. Further, the hot exhaust gas flows through the heating fluid channel 82 where the double pipe 92 is provided. The hot exhaust, and the water and the raw fuel flow in the counterflow manner (FIGS. 6 and 9).

Therefore, when the temperature of the water is increased by heat conduction from the exhaust gas, boiling of the water is prevented. The water vapor is supplied smoothly from the small holes 100 into the outer pipe 94*a*. In the structure, in the outer pipe 94*a*, the raw fuel in the gas phase and the vaporized water produced in the phase transition, i.e., the water vapor are agitated, and mixed by the rapid volume change in the phase transition. Therefore, it is possible to produce a uniform mixed fuel (mixed fluid) reliably. Further, by the exhaust gas, the temperature of the raw fuel in the outer pipe 94*a* is kept at a sufficiently high temperature which does not cause condensation of the water vapor. Re-condensation of the water vapor is prevented, and thus, the produced water vapor flows uniformly without any pulsation.

Figure 9:
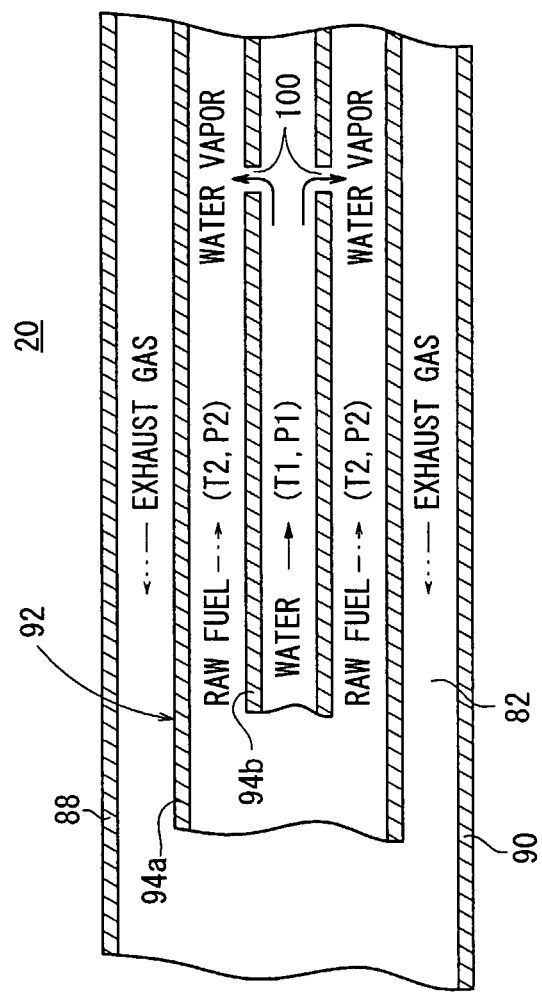
FIG. 9 is a view schematically showing operation of the evaporator.

Further, as shown in FIG. 9, the small holes 100 pass through the inner pipe 94*b* in the direction perpendicular to the flow direction of the raw fuel. The raw fuel and the water vapor in the gas phase flow perpendicularly to each other, and the gases are mixed together. Therefore, it is possible to obtain the uniform mixed fluid desirably.

Further, the temperature T1 of the water is lower than the temperature T2 of the raw fuel (T1<T2), and the pressure P1 of the water is regulated to be higher than the pressure P2 of the raw fuel (P1>P2). Thus, when the pressurized water gushes out of the small holes 100 into the outer pipe 94*a* having the relatively low pressure, the water is expanded desirably, and the raw fuel and the water vapor are smoothly and reliably mixed together.

Further, the heating fluid channel 82 is formed by the outer cylindrical member 88 and the inner cylindrical member 90. The double pipe 92 is provided between the outer cylindrical member 88 and the inner cylindrical member 90. Therefore, heat is reliably conducted from the hot exhaust gas flowing through the heating fluid channel 82 to the double pipe 92 reliably, and thus, improvement in the thermal efficiency is achieved.

Further, the double pipe 92 is provided spirally between the outer cylindrical member 88 and the inner cylindrical member 90. Therefore, the mounting density of the double pipe 92 is increased, and further improvement in the thermal efficiency is achieved. Moreover, the overall size of the evaporator 20 is reduced easily.

Then, the mixed fuel produced in the evaporator 20 is supplied to the inlet 102 of the reformer 22 through the mixed fuel supply pipe 101 connected to the outer pipe 94*a*. As shown in FIG. 7, the mixed fuel supplied from the inlet 102 into the reformer 22 flows through the hole 114 of the first receiver member 110. The mixed fuel is reformed by the catalyst pellets 118 interposed between the first and second receiver members 110, 112. Further, the mixed fuel is supplied to the next pellets 118 from the holes 116 formed in the peripheral portion of the second receiver member 112.

Thus, the mixed fuel moving along the reforming channel 120 having the serpentine pattern in the reformer 22 is reformed by steam reforming. Thus, hydrocarbon of $C_{2+}$ is eliminated to produce a fuel gas (reformed gas) chiefly containing methane. The fuel gas flows through the reformed gas supply passage 124 connecting to the outlet 122 of the reformer 22. Then, the fuel gas is supplied to the fuel gas supply passage 40 of the fuel cell stack 12.

As shown in FIGS. 4 and 5, the fuel gas from the fuel gas supply passage 40 flows along the fuel gas supply channel 58. The fuel gas flows from the fuel gas inlet 54 of the circular disk 42 into the fuel gas channel 46. In each of the electrolyte electrode assemblies 36, the fuel gas inlet 54 is formed at substantially the central position of the anode 34. Therefore, the fuel gas is supplied from the fuel gas inlet 54 to the substantially center of the anode 34, and the methane in the fuel gas is reformed to produce a hydrogen gas. The fuel gas chiefly containing the hydrogen moves along the fuel gas channel 46 toward the outer region of the anode 34.

As shown in FIG. 2, when the air supplied from the air supply pipe 86 to the heat exchanger 18 moves along the air channel 84 of the heat exchanger 18, heat exchange is carried out between air and the burned exhaust gas as descried later flowing along the second channel 80. Thus, the air is heated to a predetermined temperature. As shown in FIGS. 4 and 5, the air heated in the heat exchanger 18 is supplied to the oxygen-containing gas supply unit 41 of the fuel cell stack 12, and flows into a space between the inner circumferential edge of the electrolyte electrode assembly 36 and the inner circumferential edge of the circular disk 42 in the direction indicated by the arrow B. Therefore, the air flows from the inner circumferential edge to the outer circumferential edge of the cathode 32 along the oxygen-containing gas channel 50.

Thus, in the electrolyte electrode assembly 36, the fuel gas flows along the anode 34, and the air flows along the cathode 32 for generating electricity by electrochemical reactions at the anode 34 and the cathode 32. The exhaust gas is discharged to the outside of each of the electrolyte electrode assemblies 36, and flows in the stacking direction along the exhaust gas discharge channel 59. Then, the exhaust gas flows into the exhaust gas channel 76.

The exhaust gas flowing through the exhaust gas channel 76 has the high temperature of about 700° C. As shown in FIG. 2, the exhaust gas partially flows into the first channel 78 branched through the hole 81*a*. The exhaust gas is supplied into the inlet 102 of the reformer 22 from the rectification hole 83 of the wall 81. After the exhaust gas locally heats the inlet 102 of the reformer 22, the exhaust gas flows inside the evaporator 20, and is discharged to the outside from the exhaust gas pipe 128.

At this time, steam reforming is performed in the reformer 22, and in particular, the temperature around the inlet 102 tends to be decreased. Therefore, by locally heating the inlet 102 by the hot exhaust gas, it is possible to limit the decrease in the temperature of the reformer 22. Thus, the temperature of the reformer 22 is stabilized. It is possible to maintain the S/C (steam/carbon) ratio at a certain level.

Further, the exhaust gas supplied to the second channel 80 of the exhaust gas channel 76 flows through the heat exchanger 18. Heat exchange between the exhaust gas and the air is performed. The air is heated to a predetermined temperature, and the temperature of the exhaust gas is decreased. Some of the exhaust gas is filled in the heat insulating layer 129a, and the remaining exhaust gas flows into the heating fluid channel 82 connected to the second channel 80. The heating fluid channel 82 is formed between the outer cylindrical member 88 and the inner cylindrical member 90 of the double pipe 92 of the evaporator 20. The exhaust gas evaporates the water flowing through the water channel 98 of the double pipe 92. Therefore, it is possible to reliably produce the mixed fuel of the raw fuel and the water vapor in the raw fuel channel 96. After the exhaust gas flows through the evaporator 20, the exhaust gas is discharged to the outside through the main exhaust gas pipe 126.

Figure 10:
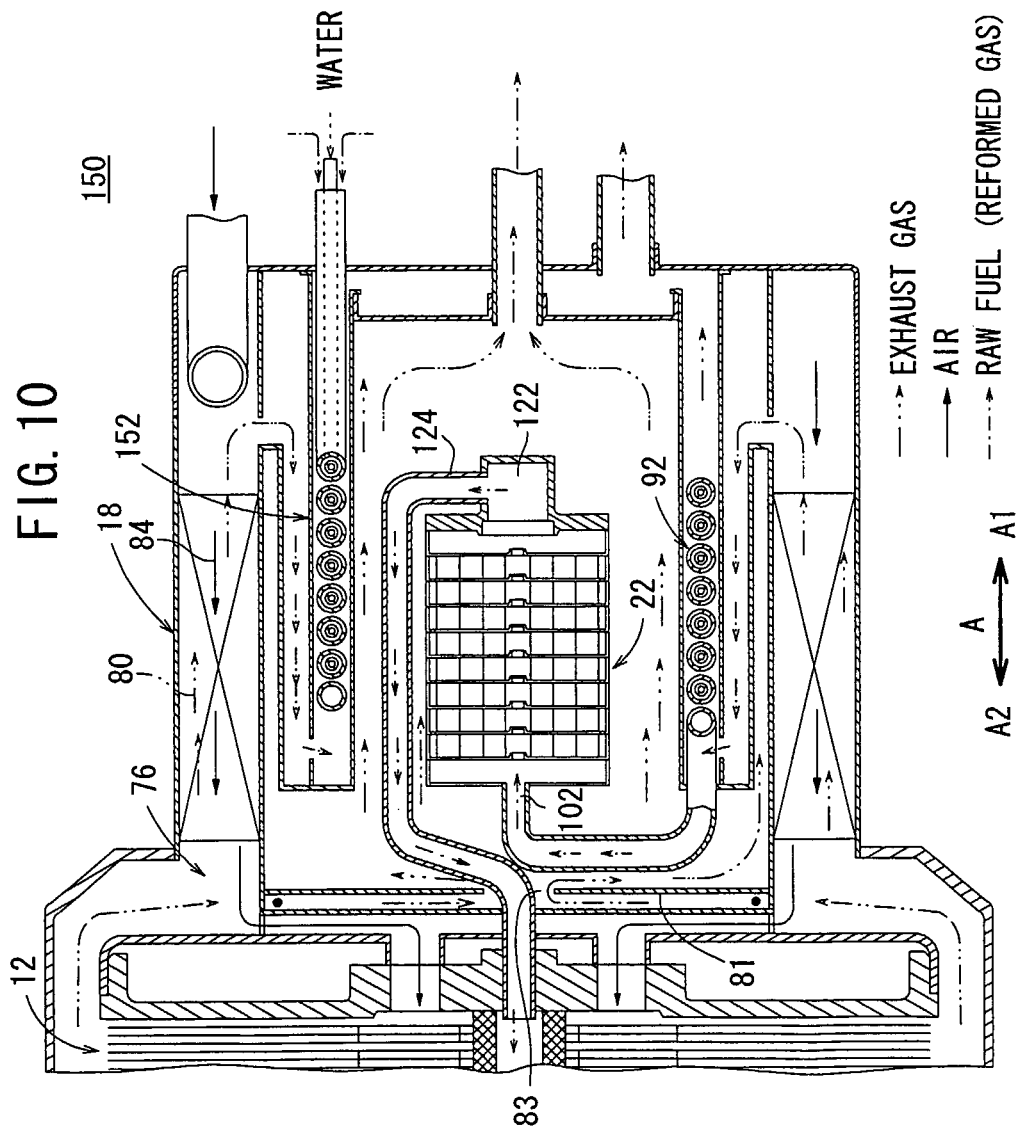
FIG. 10 is a cross sectional view showing main components of a fluid unit of a fuel cell system according to a second embodiment of the present invention.
Figure 11:
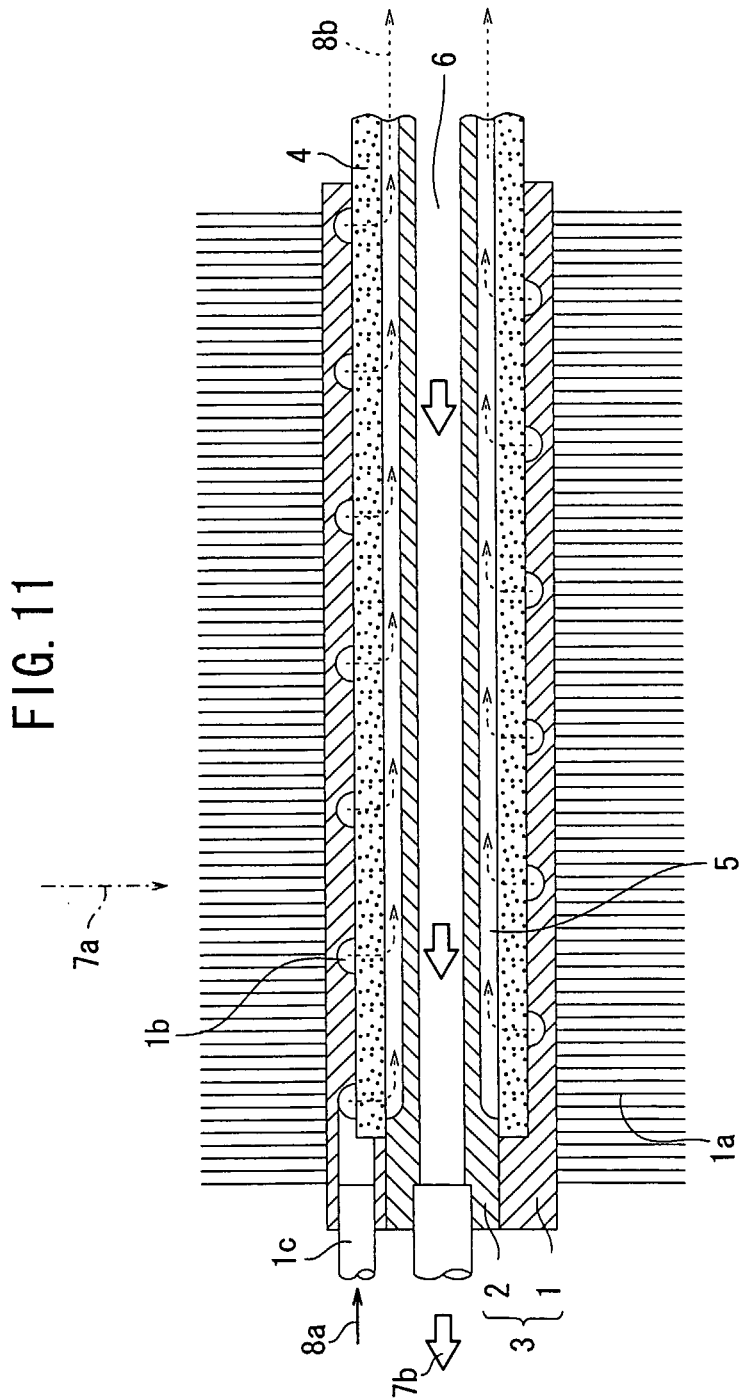
FIG. 11 is a cross sectional view showing a conventional evaporator.

FIG. 10 is a view schematically showing a structure of a fluid unit 150 of a fuel cell system according to a second embodiment of the present invention. The constituent elements that are identical to those of the fuel cell system 10 according to the first embodiment are labeled with the same reference numeral, and description thereof will be omitted.

The fluid unit 150 includes a heat exchanger 18, a reformer 22, and an evaporator 152. The fluid unit 150 is provided on one side of the fuel cell stack 12, symmetrically with respect to the central axis of the fuel cell stack 12. In the fluid unit 150, the evaporator 152 is provided outside the reformer 22, and the heat exchanger 18 is provided outside the evaporator 152.

In the second embodiment, the evaporator 152 and the reformer 22 are provided inside the heat exchanger 18. In the structure, it is possible to heat the reformer 22 by the heat radiated from the heat exchanger 18. Improvement in the heat insulation performance of the evaporator 152 is achieved effectively. It is possible to produce the water vapor easily. Further, the dimension of the fluid unit 150 in the direction indicated by the arrow A is reduced effectively. Accordingly, reduction in the overall size of the fuel cell system is achieved easily.

INDUSTRIAL APPLICABILITY

According to the present invention, in the inner tube of the double tube member, the pressurized state of the first heated fluid is maintained, and the first heated fluid is in the liquid phase. Therefore, when the temperature of the first heated fluid is increased by heat conduction from the heating fluid, boiling of the first heated fluid does not occur. The water vapor is smoothly supplied from the small holes of the inner pipe into the outer pipe. Thus, in the outer pipe, the second heated fluid and the vaporized first heated fluid produced in the phase transition are agitated, and mixed suitably by the rapid volume change in the phase transition. Therefore, it is possible to produce a uniform mixed vapor reliably.

The invention claimed is:

1. A system comprising an evaporator for producing vapor and a fuel cell, the vapor produced by heat exchange between a heating fluid flowing through a heating fluid channel and first and second heated fluids flowing through a heat conductive double pipe member provided in said heating fluid channel, wherein
    said double pipe member comprises an inner pipe as a passage of the first heated fluid and an outer pipe as a passage of the second heated fluid;
    said inner pipe has a plurality of small holes connected to said outer pipe for maintaining the pressurized state of said first heated fluid in said inner pipe, and inducing phase transition of the first heated fluid from the liquid phase to the gas phase when the first heated fluid gushes out of said inner pipe into said outer pipe, so that the first heated fluid is mixed with said second heated fluid in said outer pipe, wherein,
    a temperature in said outer pipe is higher than a temperature in said inner pipe, and a pressure in said outer pipe is lower than a pressure in said inner pipe, and
    an exhaust gas discharge channel is formed in the fuel cell for discharging an exhaust gas as a consumed reactant gas, and said heating fluid channel is connected to said exhaust gas discharge channel so that the heating fluid flowing through the heating fluid channel is a fuel cell exhaust gas.

2. The system according to claim 1, wherein the heating fluid and the first and second heated fluids flow in a counter-flow manner.

3. The system according to claim 1, wherein the second heated fluid flowing through said outer pipe is in the gas phase.

4. The system according to claim 1, wherein said small holes pass through said inner pipe in a direction perpendicular to a flow direction of the second heated fluid.

5. The system according to claim 1, further comprising an outer cylindrical member and an inner cylindrical member forming said heating fluid channel, wherein said double pipe member is provided between said outer cylindrical member and said inner cylindrical member.

6. The system according to claim 5, wherein said double pipe member is formed spirally between said outer cylindrical member and said inner cylindrical member.

7. The system according to claim 1, wherein the first heated fluid is water, and the second heated fluid is a raw fuel.

* * * * *